United States Patent [19]

Randle

[11] Patent Number: 4,517,760
[45] Date of Patent: May 21, 1985

[54] DRIVE MECHANISM FOR FISHING REEL

[76] Inventor: Jules Randle, P.O. Box 804, Baldwin, La. 70514

[21] Appl. No.: 546,303

[22] Filed: Oct. 28, 1983

[51] Int. Cl.³ .............................................. A01K 97/10
[52] U.S. Cl. ....................................... 43/21; 43/21.2; 242/84.1 A
[58] Field of Search ...................... 43/21.2, 21, 15, 17, 43/19; 242/84.1 A

[56] References Cited

U.S. PATENT DOCUMENTS

| | | |
|---|---|---|
| 1,177,885 | 4/1916 | Molnar . |
| 2,541,876 | 2/1951 | Lockwood ............................ 43/21 |
| 2,714,271 | 8/1955 | Stratton ................................ 43/21 |
| 2,760,736 | 8/1956 | Mihalko ....................... 242/84.1 A |
| 2,908,099 | 10/1959 | Burke ................................... 43/16 |
| 2,944,360 | 7/1960 | Green ................................... 43/16 |
| 3,126,166 | 3/1964 | Weinberg ..................... 242/84.1 A |
| 3,200,530 | 8/1965 | Dworski ............................... 43/16 |
| 3,252,239 | 5/1966 | Moeller ................................ 43/21 |
| 3,696,545 | 10/1972 | Gudjonsson ......................... 43/15 |
| 3,986,288 | 10/1976 | Kotaki .................................. 43/6.5 |
| 4,159,589 | 7/1979 | Pendepraft .......................... 43/15 |
| 4,349,977 | 9/1982 | Brodribb et al. .................... 43/15 |

Primary Examiner—Gene P. Crosby
Attorney, Agent, or Firm—Charles C. Garvey

[57] ABSTRACT

An automatic rod and reel support carriage apparatus automatically rotates the reel crank to retrieve a line. The apparatus provides a weighted base frame upon which is securely fastened a motordrive. A rotating hub provides radially spaced recesses which engage the reel crank. A carriage is also supported by the base for holding the reel in a position which engages the reel crank with the hub. A pivotally movable trigger provides a ferrule at its end portion which loosely engages the line so that the line can pass through the ferrule. The trigger actuates the motor drive when the line is tensed such as when a fish pulls on the line. When such tension pulls the line, the trigger is deflected and closes a microswitch that actuates the motordrive. Absent tension on the line, the trigger deflects the line away from the axis of the rod and the trigger is disengaged from the microswitch.

5 Claims, 6 Drawing Figures

DRIVE MECHANISM FOR FISHING REEL

BACKGROUND OF THE INVENTION

1. Technical Field

The present invention relates to fishing devices and more particularly relates to automatic retrieval of a fishing line responsive to tension applied to the line as when a fish is caught on the end of the line.

Even more particularly, the present invention relates to an automatic rod and reel support carriage apparatus wherein conventional rod and reel assemblies can be easily fitted to the apparatus and quickly and easily removed therefrom.

2. General Background

Sport fisherman typically use an elongated rod having a plurality of linearly spaced ferrules and a reel mounted at one end of the rod. A handle is usually provided adjacent the reel. Rod and reels are connectable together, usually at a detachable connection. There are also commercially available a number of automatic machines for catching fish which use sophisticated electronic equipment or the like.

U.S. Pat. No. 4,349,977 issued to Brodribb et al and entitled "Automatic Fishing Apparatus" teaches an automatic fishing apparatus which comprises a reel means mounted on a free clutch plate of a clutch assembly. A second clutch plate of the clutch assembly is provided on a driven shaft which also passes through the first plate. Two members are provided with bevelled surfaces one of the members having a rod which is moved when a fish takes a line coupled with the rod.

U.S. Pat. No. 3,696,545 entitled "Automatic Fishing Reel" issued to Gudjonsson teaches an automatic motor drive fishing reel having a lever pivotally mounted on a motor driven shaft, the lever also supporting a fishing line as it is reeled off the reel member.

U.S. Pat. No. 4,159,589 issued to A. E. Pendegraft for an "Automatic Hook Setter" teaches a base which is provided including a depending ground spike and a mount swingably supported from the base for angular displacement about a horizontal axis between first and second positions. Structure is operatively connected between the base and the mount yieldingly biasing the latter toward the first position and the base and mount including coacting latch structure releasably latching the mount in the second position.

U.S. Pat. No. 3,986,288 issued to Kotaki entitled "Automatic Fishing Machine" teaches an automatic fishing rod capable of swinging up and down under hydraulic pressure, and which provides for automatic unhooking of a caught fish. If the fish fails to be readily released from the hook, the rod is caused to oscillate until it is freed therefrom. The movement of the rod is effected at a controlled speed so as not to damage the caught fish.

U.S. Pat. No. 3,200,530 entitled "Fishing Apparatus" issued to Dworski is directed to electrical apparatus sensitive to a predetermined change in tension on the fish line, which results in an instant trigger release of a line retracting device. The apparatus comprises a frictional line grip and electrical contacting device adapted to close a circuit upon a predetermined increase in tension in the fish line such as results from a nibble or strike.

U.S. Pat. No. 2,944,360 issued to A. Green entitled "Trigger Fishing Devices" discloses a device for automatically hooking a fish and holding him until reeled out of the water in a conventional manner.

U.S. Pat. No. 2,908,099 entitled "Triggered Fish Pole Holder" issued to G. V. Burke relates to fish poles holders, wherein the handle of a fishing pole is placed therein, when the fisherman is fishing from a bank or a boat, so the fisherman may disregard the pole, and when a fish bites, the pull of the fish will automatically operate the trigger of the holder and the holder will automatically be operated with resultant set of the hook.

U.S. Pat. No. 1,177,885 entitled "Automatic Fishing Reel" issued to M. Molnar relates to a fish reel adapted to be secured to any suitable support, as for example some convenient portion of a boat or vessel and which will provide for automatic release of the reel when the line is drawn upon, and also to give a signal at such times, and furthermore while releasing the reel to provide a sufficient resistance and thereby regulate the speed with which the line is rewound.

GENERAL DISCUSSION OF THE PRESENT INVENTION

The present invention is directed to a carriage for holding a conventional rod and reel for automatically operating the rod when a fish applies tension to the line. The apparatus is adjustable so that rods of different length and reels of different sizes and shapes can easily be supported by and operated by the apparatus of the present invention.

The apparatus of the present invention thus provides an automatic rod and reel support carriage apparatus for automatically rotating the reel crank of a reel so as to retrieve a fishing line through a rod. The apparatus provides in part a base frame upon which is mounted a motordrive and a rotating clutch. The clutch has radially spaced recesses which engage the reel crank. A reel carriage means in the form of a plurality of deformable wires defining a basket holds the reel in a position which engages the reel crank and the clutch. The individual wires of the basket can be bent so as to deform the basket generally to the outside configuration of the reel. An elongated trigger arm is movably mounted, preferably in a pivotal fashion, to the base frame. The free end portion of the trigger arm provides a ferrule which loosely engages the line so that the line can pass therethrough. The trigger arm actuates the motordrive when the line is tensed, such as when a fish pulls the line. The weight of the arm causes the line to deflect away from the axis of the rod. When the line is tensed, the trigger arm is moved upwardly and into a position adjacent and generally parallel to the rod and in this operative position, a microswitch is closed which actuates the motordrive to rotate the clutch and the connected reel crank.

A shutoff can be provided in the form of a ferrule having a Y-shaped configuration so that a knot in the line which engages the ferrule causes the ferrule to be deformed. The ferrule then actuates a microswitch that cuts off power to the motordrive and thus de-energizes the system. The rotating clutch can be, for example, a deformable plastic or rubberized material so that differences in crank size and configuration can easily be overcome.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein.

DETAILED DESCRIPTION OF THE PREFERRED EMBODIMENT

Figure 1:
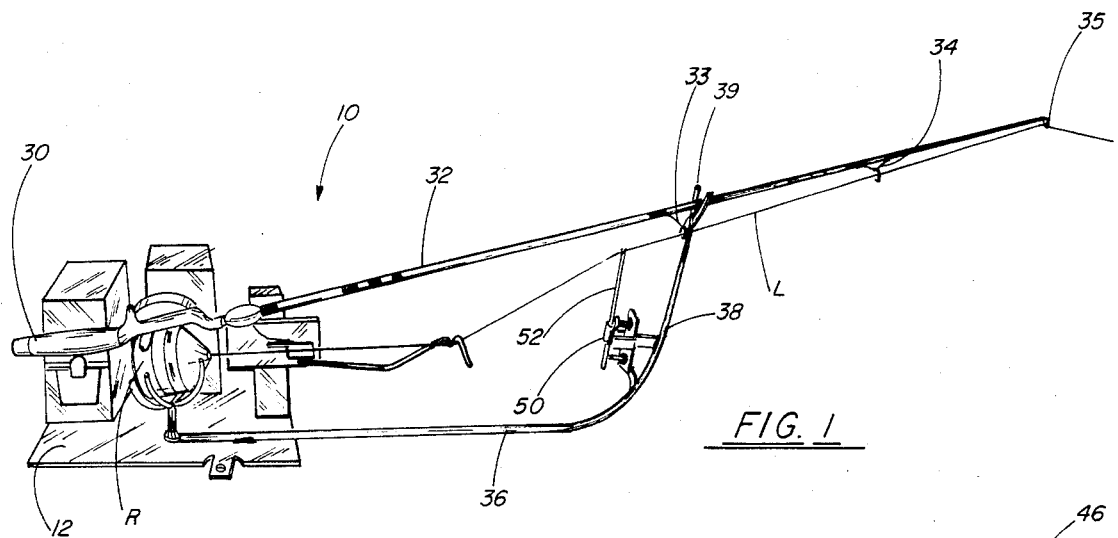
FIG. 1 is a side view of the preferred embodiment of the apparatus of the present invention in an inoperative position.
Figure 2:
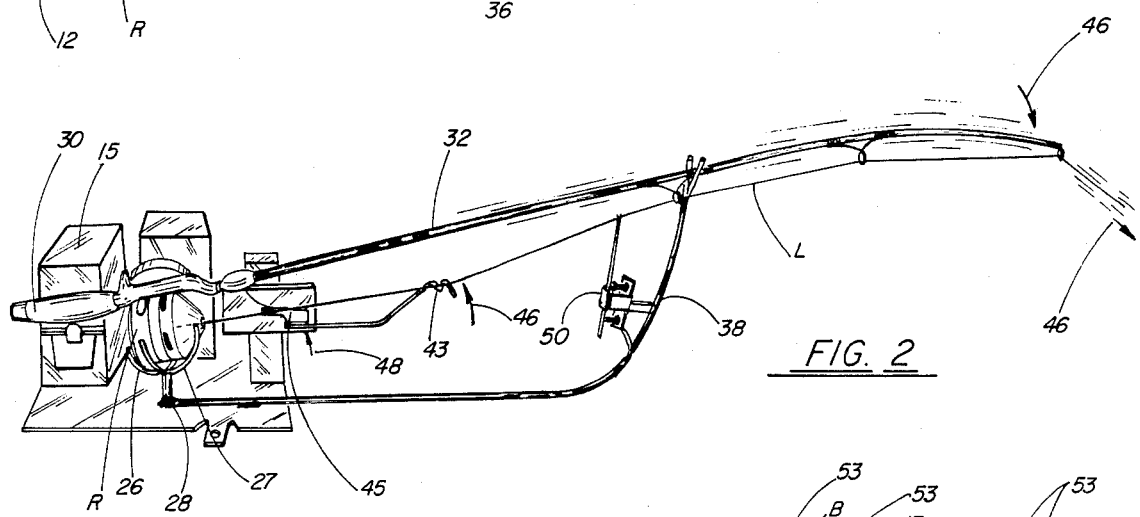
FIG. 2 is a side view of the preferred embodiment of the apparatus of the present invention illustrating an operative position, during reeling of the line.
Figure 3:
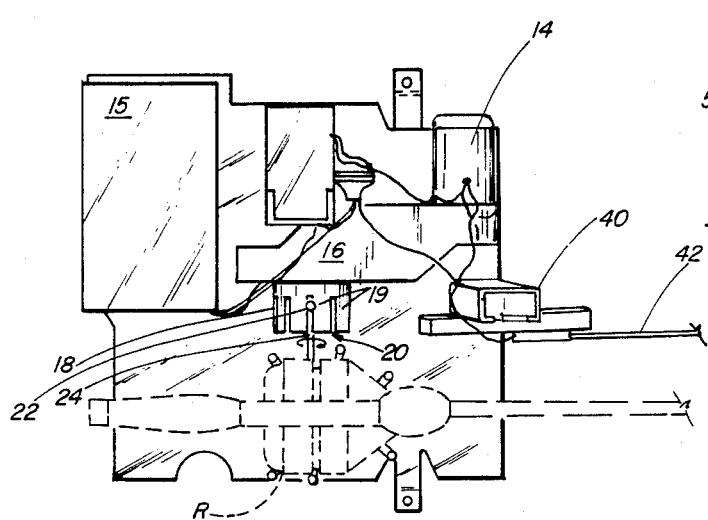
FIG. 3 is a top view of the preferred embodiment of the apparatus of the present invention showing a conventional rod and reel in phantom lines as supported by the carriage portion thereof.
Figure 5:
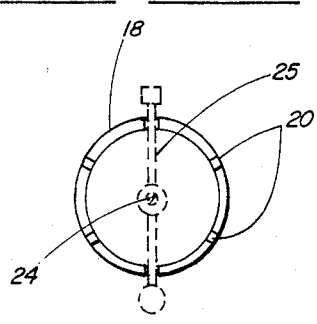
FIG. 5 is a fragmentary view of the hub portion of the preferred embodiment of the apparatus of the present invention.

FIGS. 1-3 show generally the preferred embodiment of the apparatus of the present invention designated generally by the numeral 10.

In FIGS. 1-3, there can be seen a base frame 12 which supports a motordrive 14 and a gear assembly 16. The gear reduction assembly 16 is connected to the motordrive 14 so that a step-down in rotational speed from the motordrive is effected. A battery pack 15 supplies power to motordrive 14. If desired, terminals for recharging battery 15 can be provided upon frame 12.

Supported rotatably by gear reduction assembly 16 is hub 18 which provides a plurality of radially spaced projections 19. Between the adjacent projections 19 are recesses 20. Projections 19 would preferably be of a deformable material such as plastic or rubber. The sizes of recesses 20 could be varied and the hubs 18 could be removable so as to conform to a wide variety of size and shape reels and cranks. The reel R shown in phantom lines in FIG. 3 is of a conventional type and is attached in a removable fashion to rod 32 by means of a bolted connection or the like. Rod 32 provides a handle 30 which can be gripped by the fisherman. Reel R typically provides a crank 25 having one or more handles 22 which is attached to shaft 24. Rotation of crank 25 by the fisherman causes corresponding rotation of shaft 24 which retrieves line L. Line L would be a monofilament line and would be wound upon a spool contained within reel R. Such reels R supplied with monofilament line L are conventional and well-known in the art.

Rod 32 provides a plurality of linearly spaced ferrules 33, 34, 35. As with a typical rod and reel configuration, line L passes through each ferrule 33-35 and load is transferred from the line L to the ferrules 33-35 and then to the rod 32 itself.

An elongated rod support arm 36 is anchored upon base 12 and extends forwardly and upwardly thereof until it terminates at support 39 which is forked to receive rod 32. The combination of support 39 and reel carriage 26 supports the rod 32 and reel R assembly. Carriage 26 is anchored at 28 by welding, for example, to base 12. Carriage 26 comprises a plurality of wires 27 which are preferably deformable so that they can be bent to conform exactly to the exterior of reel R. The forwardmost portion of frame 12 provides a switch bracket 40 to which is pivotally attached trigger arm 42. The pivot 45 of arm 42 is a microswitch which is actuated when a fish tugs upon line L as illustrated by the arrow 46 in FIG. 2. Responsive to the tugging action of the fish, trigger arm 42 moves upwardly as shown by the arrow 46 in FIG. 2, causing line L to align itself generally with rod 32. Arrow 48 indicates schematically the depression of microswitch pivot 45 by arm 42. Line L is deformed laterally from rod 32, primarily because of gravitational forces and the weight of arm 42. When arm 42 moves downwardly, microswitch 45 is released and the circuit is broken, cutting off motordrive 14. When the fish tugs on the line, arm 42 is lifted and the microswitch 45 is closed, activating motordrive 14. The end portion of arm 42 provides a ferrule 43 which loosely engages line L. In the preferred embodiment, ferrule 43 would be a double spiral arrangement which would permit line L to be readily attached to or removed from ferrule 43 such as, for example, when rod and reel 32, R are removed from apparatus 10 such as during storage.

Figures 4A, 4B:
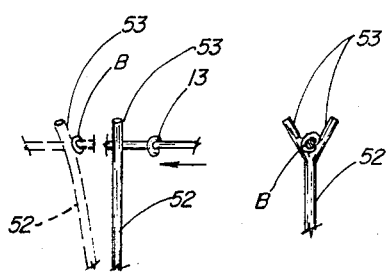
FIGS. 4a and 4b are fragmentary side and front views of the line shutoff ferrule portion of the preferred embodiment of the apparatus of the present invention.

The forwardmost portion 38 of support arm 36 provides cutoff assembly 50 which includes an elongated arm 52 having an uppermost forked ferrule 53 (see FIGS. 4a-4b). A microswitch would be provided with shutoff 50 so that when arm 52 was deflected, the microswitch 50 would interrupt power to motordrive 14, disengaging the system. Arm 52 would be activated by a small bead B placed on line L, or a knot 13 could be provided upon the line for the purposes of engaging and actuating arm 52.

Because many varying and different embodiments may be made within the scope of the inventive concept herein taught, and because many modifications may be made in the embodiments herein detailed in accordance with the descriptive requirement of the law, it is to be understood that the details herein taught are to be interpreted as illustrative and not in a limiting sense.

What is claimed as the invention is:

1. An automatic rod and reel support carriage apparatus for automatically rotating the reel crank to retrieve a line comprising:
   a. a base frame;
   b. a motor drive mounted on the frame;
   c. a rotating hub having radially spaced means for engaging the reel crank;
   d. reel carriage means for holding the reel in a position which engages the reel crank and the hub;
   e. moving means loosely engaging the line so that the line can pass therethrough, for actuating the motor drive when the line is tensed such as when a fish pulls the line, the moving means deflecting the line away from the axis of the rod absent tension on the line.

2. The automatic rod and reel support of claim 1 further comprising shutoff means for deactivating the motordrive when the line is retrieved.

3. The automatic rod and reel support of claim 1 wherein the carriage means includes a deformable carriage which conforms to and frictionally grips the reel.

4. The automatic rod and reel support of claim 1 wherein the moving means is an arm pivotally mounted with respect to the rod and carrying at one end a ferrule which loosely engages the line.

5. The automatic rod and reel support of claim 4 wherein the arm provides weight so that the ferrule laterally displaces from the rod by gravitational force upon the arm absent tension on the line.

* * * * *